March 17, 1925.

T. WOLF

ANIMAL TRAP

Filed Oct. 21, 1924

1,530,454

Inventor
Tollie Wolf.

By
Attorney

Patented Mar. 17, 1925.

1,530,454

UNITED STATES PATENT OFFICE.

TOLLIE WOLF, OF ROCKPORT, MISSOURI.

ANIMAL TRAP.

Application filed October 21, 1924. Serial No. 744,908.

*To all whom it may concern:*

Be it known that TOLLIE WOLF, a citizen of the United States of America, residing at Rockport, in the county of Atchison and State of Missouri, has invented new and useful Improvements in Animal Traps, of which the following is a specification.

The purpose of the present invention is to provide, in an animal trap especially adapted for trapping moles, a construction including a plurality of diverging members constituting legs with returned pointed extensions and disposed adjacent the outlet end of the mole hole in order to catch the animal upon entering or leaving the hole.

Another purpose is the provision of means for fastening the plurality of members, which constitute legs, together in position diverging toward the entrance to the hole, it being the aim to dispose the trap over the mouth end of the hole and cover the same with loose dirt, thereby rendering the trap unnoticeable to the animal.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
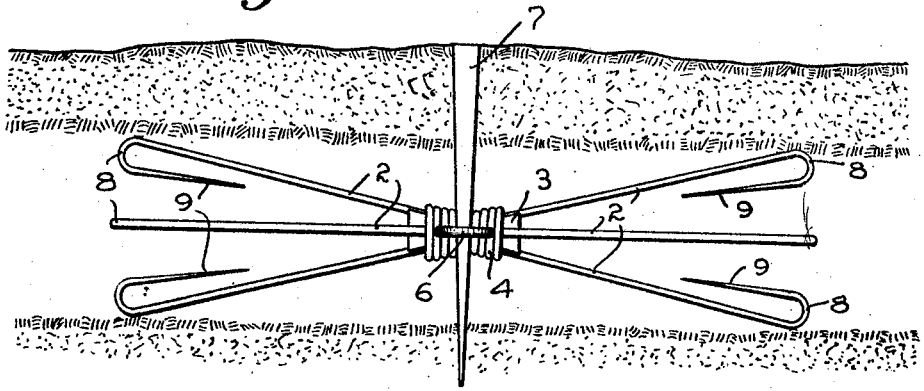
Figure 1 is a view showing the applcation of the trap adjacent the entrance of the mole hole or run, illustrating loose dirt about the trap in order to render the same unnoticeable.
Figure 2:
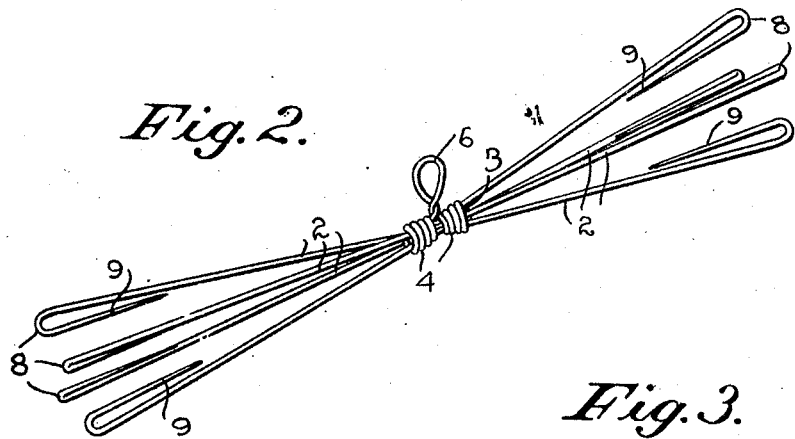
Figure 2 is a perspective view of the trap, more clearly showing the construction and arrangement of the plurality of members which constitute the legs and showing the rebent pointed extensions.
Figure 3:
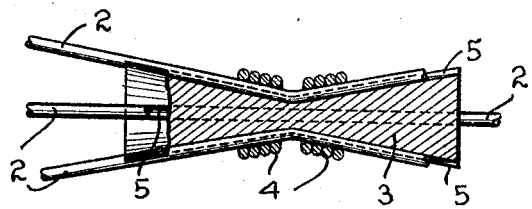
Figure 3 is an enlarged detail view of the means for fastening the plurality of members together.

Referring to the drawings, 1 designates the trap as a whole which comprises a plurality of members 2 constructed of relatively heavy wire, preferably 12 gauge. These members are arranged so as to converge toward the top of the trap and diverge toward and about the outlet of the hole or run. Where the members converge, they are fastened together on a cone 3 by means of a heavy wrapping of wire 4, the members 2 engaging seats 5 formed in the cone.

A loop 6 is connected to the cone and is adapted to receive an anchoring stake 7 for retaining the trap in position. The stake passes through the loop and is driven into the ground.

The diverging end portions of the members 2 are bent and sharpened at 8 and are driven into the ground, as shown, and the bent portions 9 (which are tapered and sharpened) are disposed so as to extend convergently from the entrance to the hole or run.

The sharpened extensions 9 converge on different angles to those of the major portions of the members 2, the purpose being that when the mole or animal leaves the hole, it crawls to a position beyond the pointed terminals of the extensions, and when it discovers that it cannot proceed further, it endeavors to back out. In this case, the sharpened extremities will engage with the body of the animal and prevent retrogression.

However, when the animal is crawling into the trap and endeavoring to pass the sharpened extensions, the extensions spring apart to permit the animal to pass. When the terminal extremities of the extensions are free from contact with the body of the animal, they will return to their normal positions and thereby prevent return movement of the animal.

The invention having been set forth, what is claimed is:

1. An animal trap comprising a plurality of members positioned to converge from the entrance to a mole hole or run, means consisting of a wrapping and a cone with member engaging seats for fastenng the members together at their converged ends, and means for anchoring the trap to the ground, said members constituting legs to engage in the ground around the entrance to the mole hole and provided with rebent sharpened extremities, likewise converging but upon different angles to the major portions of the members.

2. An animal trap comprising a plurality of members positioned to converge from the entrance to a mole hole or run, means consisting of a wrapping and a cone with member engaging seats for fastening the members together at their converged ends, means for anchoring the trap to the ground, said members constituting legs to engage in the ground around the entrance to the mole hole and provided with rebent sharpened extremities, likewise converging but upon different angles to the major portions of the members, said anchoring means comprising a loop carried by the converged ends of the members, and a stake passing through the loops and driven into the ground to hold the trap in position.

In testimony whereof he affixes his signature.

TOLLIE WOLF.